May 31, 1960 R. C. GORDON ET AL 2,938,804
IRRADIATION METHOD AND APPARATUS
Filed Sept. 13, 1957 6 Sheets-Sheet 1
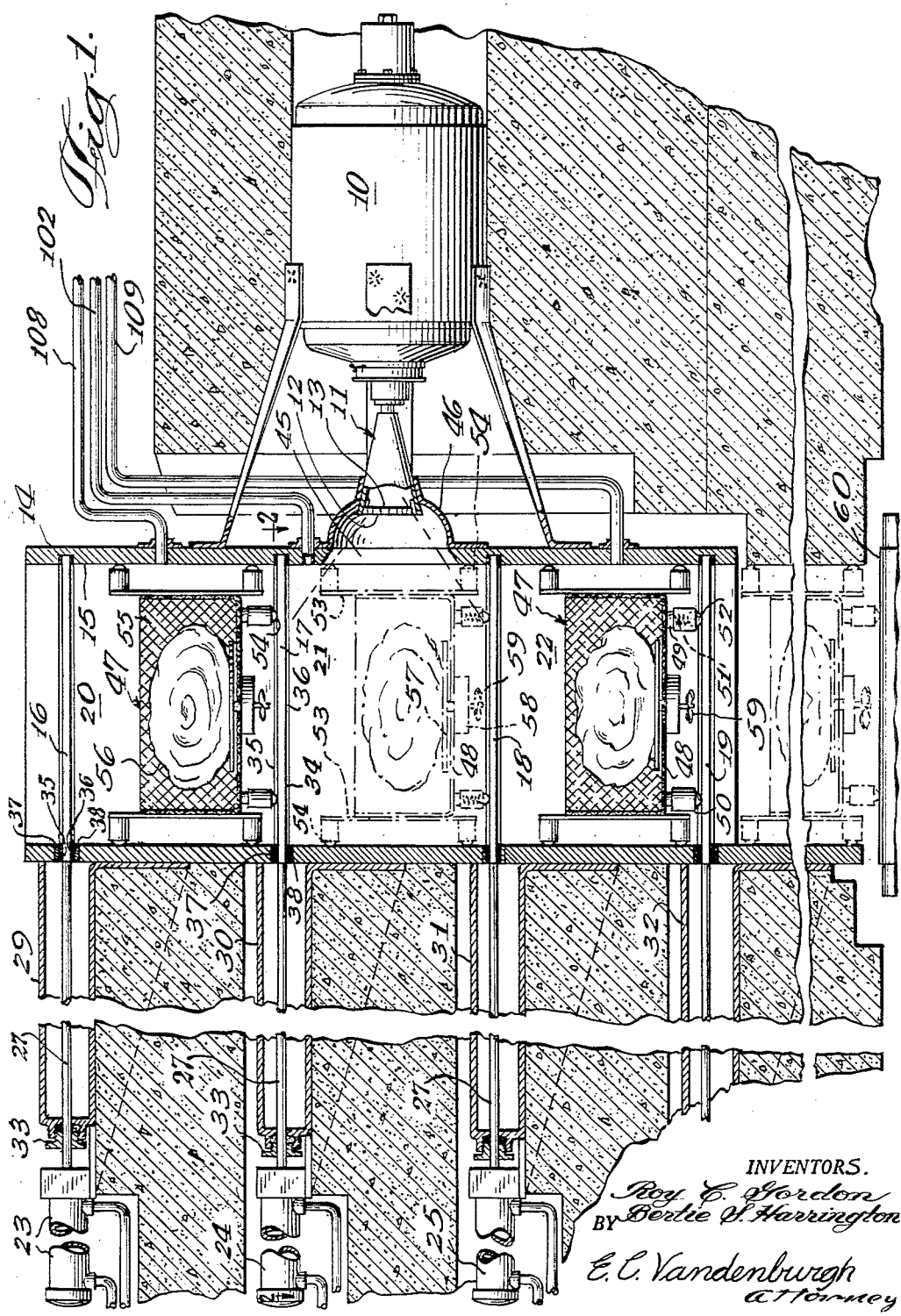
INVENTORS.
Roy C. Gordon
Bertie J. Harrington
BY
E. C. Vandenburgh
Attorney

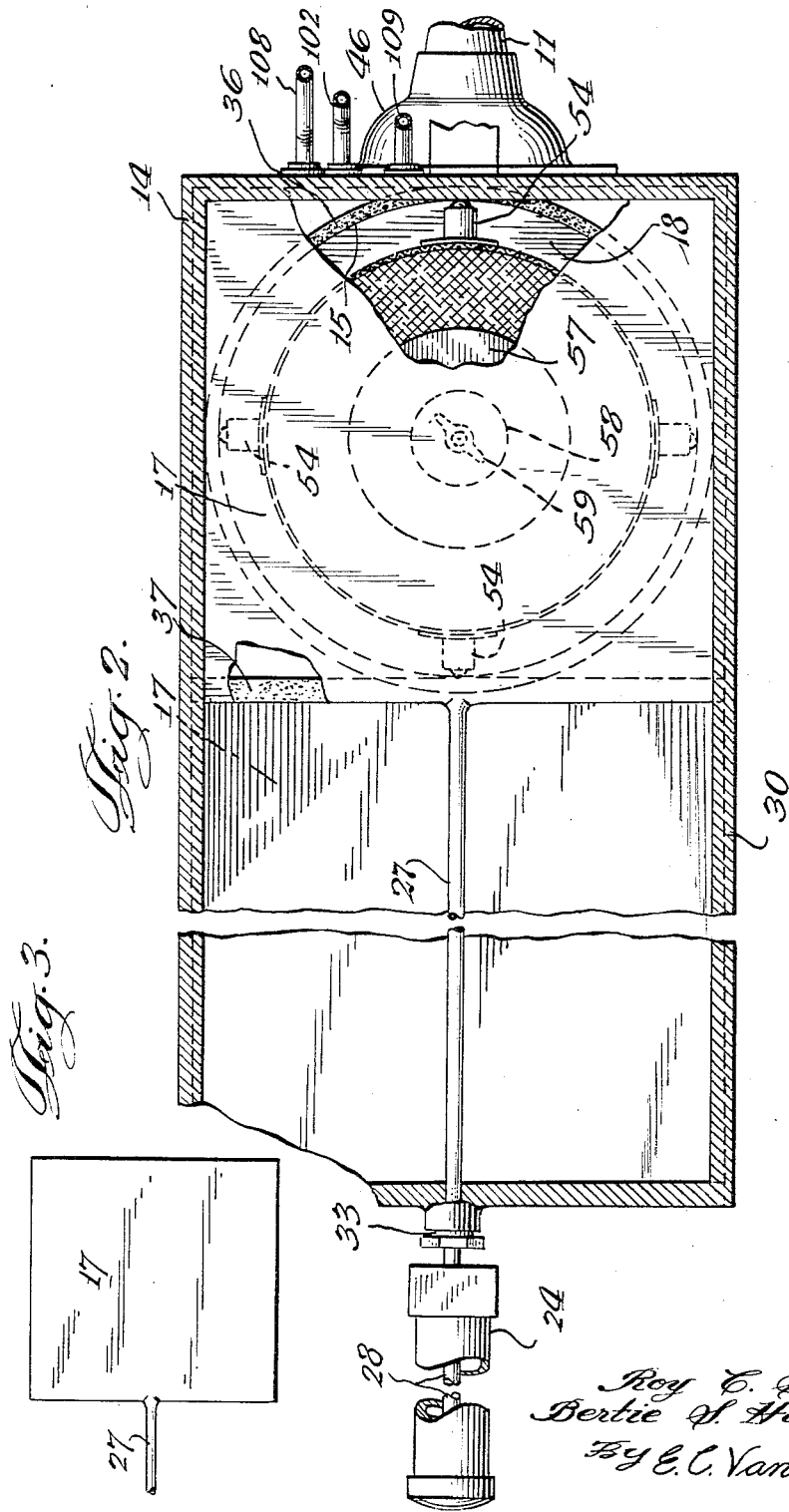

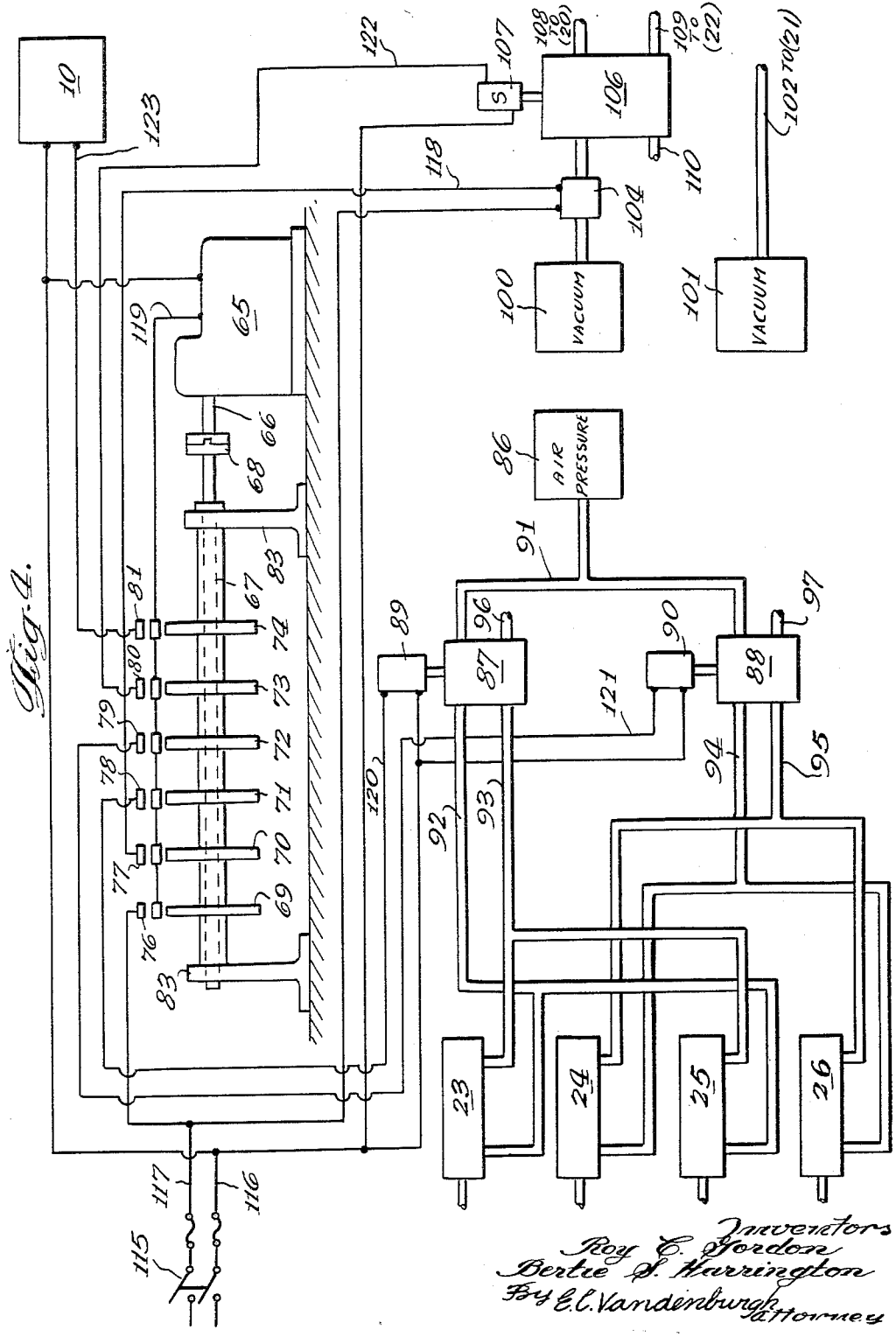

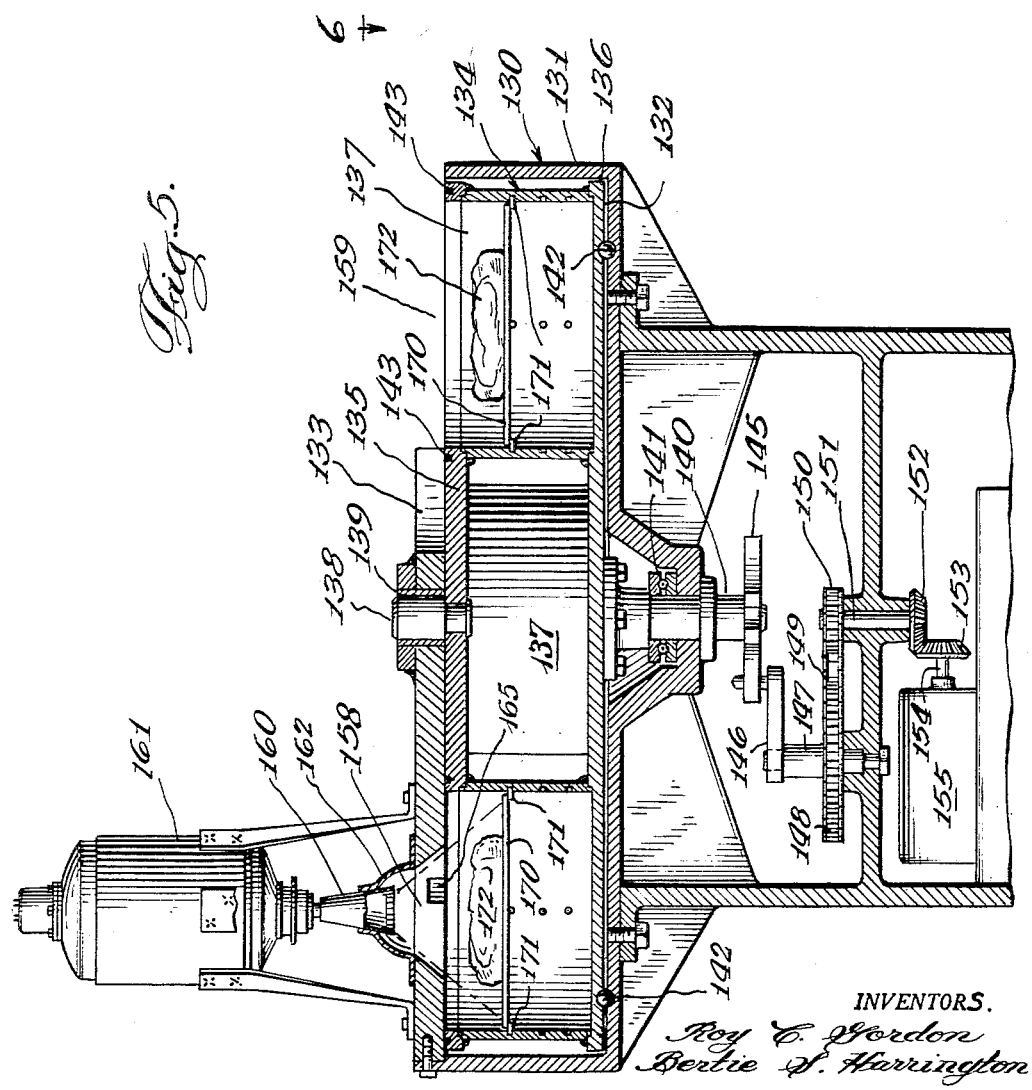

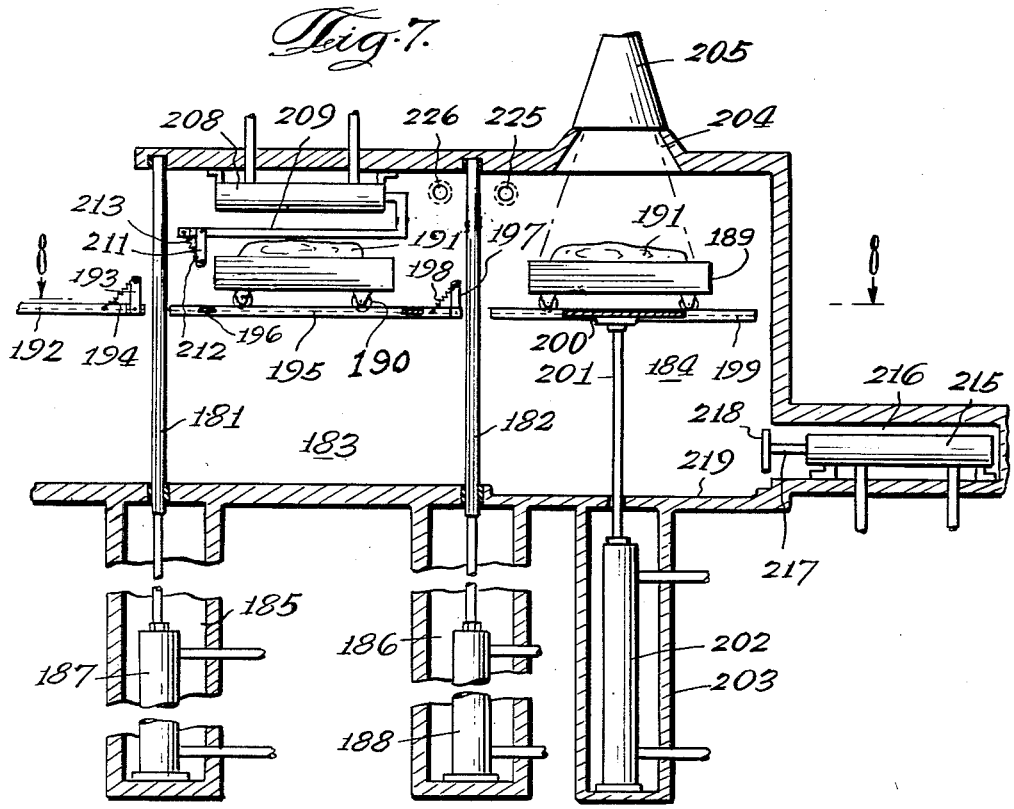
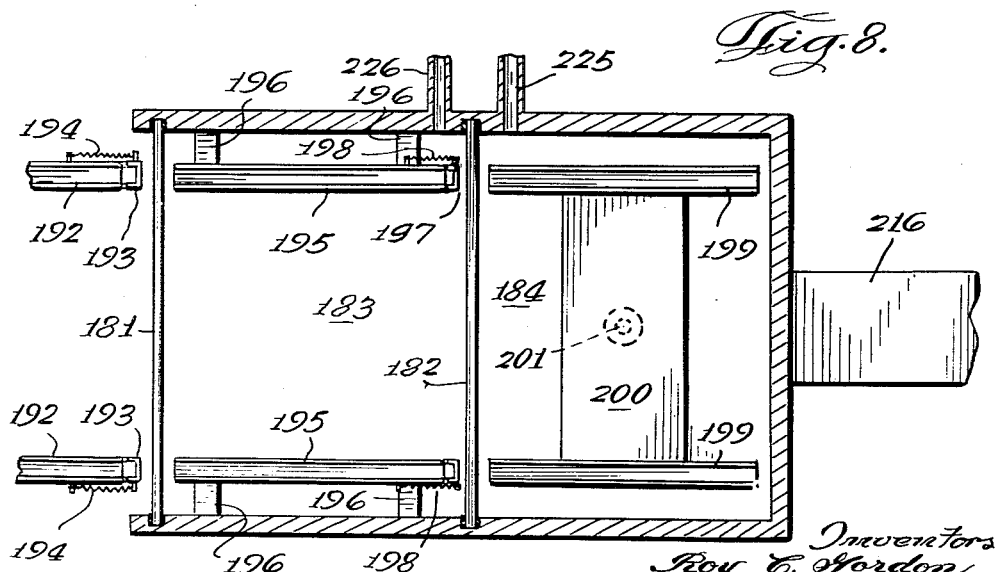

United States Patent Office 2,938,804
Patented May 31, 1960

2,938,804

IRRADIATION METHOD AND APPARATUS

Roy C. Gordon, Oak Lawn, and Bertie S. Harrington, Chicago, Ill., assignors to Armour and Company, Chicago, Ill., a corporation of Illinois Filed Sept. 13, 1957, Ser. No. 683,776

14 Claims. (Cl. 99—217)

The present invention relates to a method and apparatus for the irradiation of substances.

Two significant problems have been encountered by those working in the field of cold sterilization of foodstuffs. One has been the production of unwanted color and flavor changes in the product. The other has been the problem of obtaining a sufficient quantity of high speed beta rays, etc., to kill the bacteria without excessive periods of irradiation. The principal object of the present invention is directed to the abatement of these problems.

Radiation equipment, other than that using natural sources of radiation, usually employs a tube in which the electrons, etc., are accelerated. Such tubes have a window at one end through which electrons are emitted for use in the irradiation process, but windows have recognized disadvantages. In the first place the window will absorb some of the radiant energy; the thicker the window the more radiant energy will be absorbed therein. This reduces the energy output of the tube and the heat produced by the absorption of the radiant energy must be dissipated. Secondly the windows are often punctured by the radiant energy necessitating a shutting down of the equipment and a replacement of the windows. After the window has been replaced the tube must be re-evacuated before the equipment again can be used.

Various proposals have been made from time to time seeking to solve this problem, for example, some workers in the field have contemplated the use of readily movable windows so that a new window surface may be provided quickly and without complete release of the vacuum when a window has been punctured. Other efforts directed towards the use of lighter weight windows contemplate the placing of grids behind the window within the tube to support the window against the pressure differential between the outside of the tube and the evacuated condition within the tube. While these grids provide mainly open areas for the electrons to pass through they will absorb additional energy when the electrons strike the grid rather than passing through the openings between the grids.

One facet of the principal object of the invention is to provide a method and apparatus by which the efficiency of such radiation equipment can be increased in terms of electron output beyond the tube as compared to the quantity of electrons actually produced within the tube. In the present invention this is done by maintaining air pressures beyond the end of the tube substantially equal to the air pressure within the tube. Equivalent air pressures are maintained at all times so that at no time is there a great pressure differential beyond the tube and within the tube. This permits much lighter weight windows and also if a window fails, it is much easier to replace it with a mechanical transport, etc., as contemplated by the prior art (see for example Patent 2,617,953), and to re-establish the proper vacuum conditions within the tube.

The second facet of the principal object of the invention is the elimination of ozone about the product without the necessity of resorting to special packaging proceedures. It has been recognized that ozone was at least one of the factors that resulted in the production of undesirable flavor and color changes when foodstuffs were irradiated. The prior art has suggested the use of special vacuum packages so that there would be a negligible amount of oxygen present about the product to be converted into ozone. Not only are there many cuts of meat, etc., particularly irregularly shaped objects, difficult and expensive to vacuum package, but the package itself further reduces the amount of radiation that reaches the product. Through the use of our invention it is not necessary to vacuum package the product in order to achieve the same reduction in the ozone present about the product when it is irradiated.

The present invention also eliminates any danger of harm to workers carrying out the irradiation of substances which otherwise might result from excessive contact with ozone. Not only is there very little oxygen present at the end of the radiation tubes to be converted into ozone, but the radiation is all carried out in a confined space into which the workers are not required to go so that there is no opportunity for them to come into contact with the little ozone that may be produced.

Our invention contemplates the use of air locks in order to introduce the substance to be irradiated into an evacuated radiation chamber without destroying the low pressure conditions in that chamber. In the following portion of the specification we shall describe three separate embodiments for carrying out the objects of our invention, namely, the embodiment shown in Figures 1 to 4; the embodiment shown in Figures 5 and 6; and the embodiment shown in Figures 7 and 8.

Other objects and advantages will become apparent from the following description taken in conjunction with the drawings in which:

Figure 1 is a sectional elevation of an embodiment of the present invention;

Figure 2 is a section taken at line 2—2 of Figure 1;

Figure 3 is an isolated planview of the door used in embodiment of Figures 5, 1 and 2;

Figure 4 is a schematic illustration of a control apparatus for use with the embodiment of Figure 1 through 3;

Figure 5 is an elevational view in section of a second embodiment of the invention;

Figure 7 is an elevational view in section of a third embodiment of the invention; and Figure 8 is a section taken at line 8—8 of Figure 7.

Figure 6:
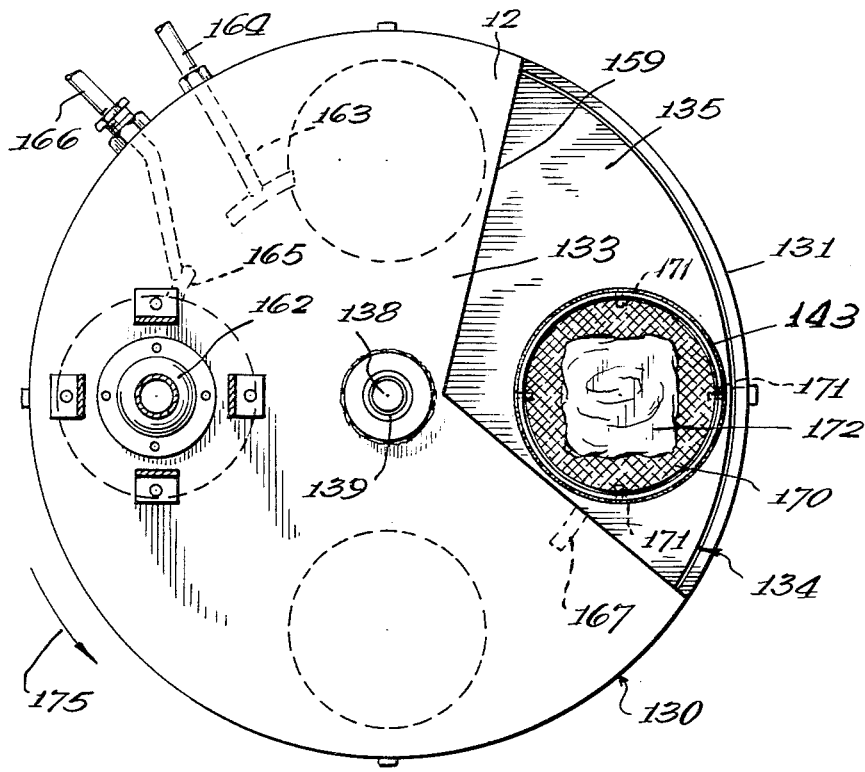
Figure 6 is a section taken at line 6—6 of Figure 5.

Referring to Figure 1 a resonant transformer, generally 10, is used as a source of high voltage to accelerate electrons through an evacuated tube, generally 11, centrally disposed within the transformer. Such tubes and transformers are well known apparatus, manufactured and sold by electrical equipment companies, e.g., see Nucleonics, vol. 11, No. 11, pages 64–66, November 1953. At the end of tube 11 is a thin stainless steel sheet forming the window 12. The window is supported by a stainless steel grid 13. The irradiation chamber and air locks are formed within a rectangular casing 14 which has a round tube 15 centrally disposed therein. Four movable doors 16 through 19 are used to divide tube 15 into an entrance air lock 20, a radiation chamber 21 and an exit air lock 22. Concrete or other shielding material is used about the radiation chamber 21.

Four fluid cylinders, in this case air cylinders, 23 through 26 are used to move doors 16 through 19 respectively. Referring to Figures 2 and 3 it will be seen that door 17 is attached to an operating rod 27 which actually is an extension of the piston rob 28 of air cylinder 24. Four door chests 29 through 32 extend out to one side of casing 14 and provide receptacles for the doors 16 through 19 respectively when the doors are open. At the end of each chest, for example chest 30 is a packing gland 33 through which the operating rod 27 moves. Door 17 is received in a slot 34 in tube 15. Secured in the upper side of the slot 34 is a gasket 35 and a similar gasket 36 is attached to the bottom side of the slot. Straight gaskets 37 and 38 are across the upper and lower sides respectively of the opening at the side of casing 14 between the casing 14 and the chest 30. The respective parts associated with each of doors 16, 18 and 19 correspond to that just described for door 17.

An opening 45 in one wall of casing 14 and tube 15 in the area of irradiation chamber 21 is used to allow the electrons to pass from the tube 11 into irradiation chamber 21. A housing 46 surrounds opening 45 and provides a seal between the sides of tube 11 and the casing 14.

The substance to be irradiated is moved from the outside through the air locks and the irradiation chamber by a suitable conveyor system. In Figure 1 a plurality of carriers, generally 47, are used in conjunction with tube 15 and doors 16 through 19 to form this conveyor. Each of carriers 47 comprises a base plate 48 which is supported by four pairs of telescoping tubes 49 and 50. A spring 51 within the tubes urges the outer tube 50 downwardly away from the inner tube 49 which is secured to base plate 48, with a suitable shoulder (not shown in the drawings) being provided to prevent the tubes from completely separating. The telescoping tubes and spring thus form a shock absorber structure. Captive balls 52 secured in the outer tube form wheels for the support of the carriers. At four sides of carriers 47 are vertical members 53 carrying captive ball guides 54 at the top and bottom. Vertical members 53 are attached to base plate 48. They should be formed of material relatively transparent to electrons so that if they become aligned in front of tube 11 they will cut off only a small amount of radiation. Relatively open wire mesh 55 is used to form the sides of carriers 47.

In the embodiment illustrated in Figure 1, the substance to be irradiated is a cut of meat 56. In order to obtain uniformity of penetration without using extremely high powered irradiation equipment, provision is made for the rotation of the cut of meat 56. To achieve this, the cut of meat 56 is supported on a plate rotated by a clockwork motor 58 secured to the bottom of baseplate 48. Clockwork motor 58 is wound by a key 59. A discharge conveyor 60 is used to receive the carriers 47 after they have been removed from the irradiation equipment.

Referring to Figure 4, the control apparatus is operated by a slow speed timing motor 65 which has its output shaft 66 connected to a timing shaft 67 by a suitable coupling 68. Timing shaft 67 carriers a plurality of cams 69 through 74 which actuate a plurality of electrical switches 76 through 81, respectively. Shaft 67 is suitably mounted in bearings 83.

The air to operate cylinders 23 through 26 is delivered by a suitable source of air pressure 86. The application of the air pressure is controlled by two fourway valves 87 and 88 which are actuated by solenoids 89 and 90, respectively. A pipe 91 connects the source of air pressure 86 to each of valves 87 and 88. One end of air cylinders 23 and 25 is connected by a means of a pipe 92 to fourway valve 87 while the other end of cylinders 23 and 25 is connected to fourway valve 87 by a pipe 93. Similarly pipe 94 connects fourway valve 88 to one end of air cylinders 24 and 26 while pipe 95 connects the same valve to the opposite end of the same air cylinders. Pipes 96 and 97 connected to valves 87 and 88 respectively are exhaust pipes which communicate to atmosphere.

Two sources of vacuum are employed, one source 100 is used for the air locks while the other source 101 is used for the irradiation chamber. Source 101 communicates with the irradiation chamber 21 through a pipe 102. A pipe 103 connects vacuum source 100 with a vacuum regulating switch 104. A pipe 105 connects regulating switch 104 to a fourway control valve 106 accuated by a solenoid 107. A pipe 108 connects fourway control valve 106 to air lock 20. A pipe 109 communicates between air lock 22 and fourway control valve 106. Pipe 110 on valve 106 is an exhaust pipe.

Power is supplied to the control apparatus through a main switch 115 from a suitable source of electric power, not shown. Two electrical feed lines 116 and 117 lead from switch 115. Line 116 is a common line and connects to the irradiation apparatus 10, the motor 65, and solenoids 89, 90 and 107. Line 117 connects to one side of switch 76 and to vacuum regulating switch 104. A wire 118 connects the vacuum regulating switch 104 to one side of switch 77. A wire 119 connects one side of the switches 76 through 81 and also leads to motor 65. Wires 120 and 121 connect from switches 78 and 79 to solenoids 89 and 90 respectively. A wire 122 connects 80 with solenoid 107 and a wire 123 connects switch 81 with radiation source 10.

In the operation of the device air pressure source 86 and vacuum sources 100 and 101 are energized. Vacuum source 101 should evacuate the irradiation chamber 21 to a pressure approximately equaling that within electron tube 11. At such a pressure the supporting grid 13 for the window 12 may be eliminated. Approximately 29" of mercury will provide a suitable vacuum for this purpose. Switch 115 is closed to energize the control circuits. Normally switch 76 is closed by cam 69 to supply electrical energy to switches 78 through 81. However, at two points in the cycle, as will hereinafter be described, switch 76 opens so that switch 77 through the vacuum regulating switch may check the vacuum pressure in the input and output locks 20 to 22 respectively. With solenoids 89 and 90 de-energized fourway valves 87 and 88 are positioned so the doors 16 through 19 will all be closed. As motor 65 commences the rotation of timing shaft 67, switch 80 closes to energize solenoid 107. This positions fourway valve 106 so that pipe 108 leading to entrance lock 20 is connected to exhaust pipe 110 and pipe 109 leading to outlet lock 22 is connected to vacuum source 100. This brings the pressure in entrance lock 20 up to the ambient pressure at which time switch 78 closes to energize solenoid 89 and reposition fourway valve 87. The repositioning of valve 87 applies air pressure from pipe 91 to pipe 92 which acuates cylinders 23 and 25 to open doors 16 and 18 respectively. Immediately before this was done, however, switch 76 opened and switch 77 closed. If the vacuum in outlet lock 22 had not reached the pressure for which switch 104 was set, normally the pressure of the irradiation chamber 21, no electrical power would have been supplied through regulating switch 104 to the switches 71 through 74 and to motor 65 which would shut-down the system and prevent the opening of door 18 at a time when the pressure in the outlet lock 22 was not equal to the pressure in the irradiation chamber 21. If switch 104 were open because of inadequate vacuum, it would close to continue the cycle as soon as the vacuum reached the desired amount. Following this check for the vacuum in the outlet lock, switch 76 again closed and switch 77 opened to continue the normal operation of the apparatus.

With door 16 open a carrier 47 having product therein is dropped into the circular tube. At the same time, if there were a carrier in the irradiation chamber 21, it would have dropped from the irradiation chamber into the outlet lock 22 upon the opening of door 18. Switch 78 then opens deenergizing solenoid 89 and permitting fourway valve 87 to return to its original position. The original position connects pipe 92 with exhaust pipe 96 and applies air pressure from source 86 through pipe 91 and pipe 93 to the opposite end of cylinders 23 and 25. This returns the doors 16 and 18 to their closed position. After doors 16 and 18 have closed switch 80 opens to de-energize solenoid 107 and permit fourway valve 106 to reposition itself. When this is done, valve 106 applies vacuum through pipe 108 to entrance lock 20 and exhausts outlet lock 22 through pipe 109 and exhaust pipe 110 to atmosphere.

After a time sufficient to permit vacuum source 100 to evacuate entrance lock 20 to the desired pressure, switch 76 opens and switch 77 closes, so that a check of the vacuum in entrance lock 20 is made by vacuum regulating switch 104. If the vacuum has been drawn to the desired pressure, the apparatus continues to run and switch 77 opens with switch 76 closing at the same time. Switch 79 now closes to energize solenoid 90 and reposition fourway valve 88. This applies air pressure from pipe 91 to pipe 94 and exhausts pipe 95 to atmosphere through pipe 97. The change of air pressure on cylinders 24 and 26 opens doors 17 and 19. The opening of door 17, allows the carrier 47 in entrance lock 20 to drop into irradiation chamber 21 and the opening of door 19 permits the carrier 47 in outlet lock 22 to drop on to discharge conveyor 60. Switch 79 then opens to de-energize solenoid 90 to position valve 88 so that cylinders 24 and 26 will close doors 17 and 19 respectively.

While carrier 47 with the product to be irradiated is in the irradiation chamber, switch 81 closes to actuate transformer 10 so that a voltage will be appdied to tube 11 to emit electrons therefrom. The electrons will bombard the product within the carrier. Prior to the carrier 47 being inserted into the entrance lock 20, clock motor 58 was wound so that during the period of time the carrier is passing through the two locks and the irradiation chamber supporting plate 57 is rotating and turning the product with it. Thus the product will be bombarded from all sides by the electrons from tube 11 during the period of time that transformer 10 is energized.

Following the closing of doors 17 and 19, switch 80 is closed to energize solenoid 107 repositioning fourway valve 106. This evacuates outlet lock 22 and applies air pressure to inlet lock 20. After a check is made of the extent of evacuation of outlet lock 22 through vacuum regulating switch 104, switch 78 closes to energize solenoid 89 and reposition fourway valve 87. As previously described this opens doors 16 and 18 to permit product to be inserted with a carrier into the entrance lock 20 and to permit the carrier 47 in the irradiation chamber 21 to drop into the outlet lock 22. The described cycle continues with product always being inserted at the top into entrance lock 20 and dropping from the bottom through outlet lock 22.

It will be noted that at no time are any of the doors leading to the irradiation chamber 21 opened until the pressure on the air lock side of that door has been reduced to the desired pressure in the irradiation chamber. Similarly doors 16 and 19 are not opened except after the pressure within the respective locks has been raised to the pressure existing outside of the apparatus. With respect to each of the doors, a seal is maintained around the door by the pressure differential on the opposite sides of the doors. This pressure differential presses the door against the gasket on the low pressure side so as to obtain a good seal around the door. If little or no pressure differential exists on opposite sides of the doors, there is little or no necessity for maintaining any seal about the door and the fact that the pressure differential will not hold the door tight against the gasket is then unimportant. It is to be remembered that no door is opened before the pressure on opposite sides thereof has been equalized. Before a door is withdrawn the pressure in the chest 29 through 32 associated with the particular door that is being opened either will have been reduced to the pressure existing on the opposite sides of the door to be opened by leakage through the gaskets associated with the door, or if sufficient leakage does not occur around the gaskets to change the pressure within the chest to that existing on both sides of the door, the gaskets 37 and 38 will provide a seal for the period of time that the door is opened to prevent any change in pressure on the inside of tube 15 resulting from a different pressure existing within the chest into which the door is drawn.

When product is being passed through the apparatus which has little or no moisture content, it may be possible to completely eliminate the use of any window 12 on irradiation tube 11. In such a case the vacuum drawn by the sources 100 and 101 should be sufficiently great to provide the desired vacuum within the vacuum tube 11. Normally in such a case, a filter to remove any moisture from the air used to pressurize chambers 20 and 22 will be connected to exhaust pipe 110 of fourway valve 106, a filter will not be necessary where the ambient humidity conditions are low. If a sufficiently powerful vacuum source is used, it may be possible to combine the two vacuum sources 100 and 101. We prefer to use two separate sources so as to prevent any possibility of reducing the vacuum in the irradiation chamber 21 at the time that the adjacent locks are first evacuated. The initial load on the vacuum source 100 when it is first connected to a pressurized lock to evacuate that lock is relatively high and if a sufficiently strong vacuum source is not supplied, the effect might be to reduce the amount of vacuum in irradiation chamber 21 during the initial period when one of the locks 20 or 22 was being evacuated from the ambient pressure.

Another modification would lie in the elimination of the vacuum control switch 104. If the vacuum source 100 is sufficiently strong so that one could be sure that the lock to be evacuated would be positively evacuated during the time cycle provided by the operation of motor 65, there would be no necessity for checking vacuum in the locks before they were placed in communication with the irradiation chamber by the openings of the communicating door. Also the control switch 81 which controls the operation of the high voltage transformer 10 can be eliminated with the transformer 10 being energized during all of the complete cycle. This would tend to be wasteful but in some types of equipment where a "warm up" period is necessary it might be desirable to operate the irradiation equipment all the time rather than to take the time for the electron irradiation equipment to reach its optimum performance. Various modifications of the carrier 47 will be apparent to those skilled in the art. With some types of product to be irradiated it may not be necessary to rotate the product. In this case the supporting plate 57 and clockwork motor 58 could be despensed with. As suggested by the prior art, more than one radiation tube 11 directed into the radiation chamber may be used to accomplish the same result as is done by rotating the product. In many instances it will be desirable to eliminate the wire mesh 55 employed in the described embodiment to prevent the product from falling out of the carrier.

Another obvious modification would be to change the sequence of operation. In the described embodiment doors 16 and 18, and 17 and 19, were opened simultaneously. The cycle could be changed so that doors 16 and 19 were opened simultaneously with a carrier being inserted in the entrance lock 20 and another removed from the exit lock 22 at the same time. After both doors 16 and 19 were closed and both the locks 20 and 22 were reduced to the pressure of the irradiation chamber 21, door 18 could be opened to drop a carrier 47 from the irradiation chamber 21 to the outlet lock 22. Door 18 is then closed and door 17 would be opened to drop the carrier 47 from the input lock 20 into the irradiation chamber 21. Door 17 would then be closed and both of the locks 20 and 22 raised in pressure to the ambient pressure after which the two outside doors 16 and 19 would be opened for the insertion and removal of the carriers.

Referring to the embodiments of Figures 5 and 6 a frame generally 130 includes a cylindrical casing 131 having a bottom plate 132 and a top plate 133. A cylindrical rotatable member generally 134 is received within casing 131 and has a top plate 135 and a bottom plate 136. In rotatable member 134 are a plurality of wells 137 forming chambers closed except at the top thereof. In the illustrated embodiment there are four of these wells 137. A stub shaft 138 secured to top plate 135 is suitably journaled in a bearing 139 in top plate 133. Attached to bottom plate 136 is a stub shaft 140 journaled in a bearing 141 in frame 130. Concentric grooves forming races are formed in bottom plates 136 and 132 with a plurality of ball bearings 142 being received in the races, supporting the rotatable member 134 in cylindrical casing 131. Annular seals 143 are received in recesses in top plate 135 about each of the wells 137. Top plate 133 and 135 are machined flat so as to normally prevent any air leakage between these plates. The seals 143 will take care of wear and possible leakage between the two top plates 133 and 135.

Attached to the bottom end of shaft 140 is the driven member 145 of a Geneva drive. The driving member 146 of the Geneva drive is attached to a shaft 147 which is suitably journaled in frame 130. A sprocket 148 is attached to shaft 147 and is driven by a chain 149 from a sprocket 150 on a shaft 151. Shaft 151 is journaled in frame 130 and carries a bevel gear 152 which is engaged by bevel gear 153 on the output shaft 154 of a motor 155.

Openings 158 and 159 are provided in top plate 133. Opening 159 is for the purpose of access for the removal of product from and the insertion of product into wells 137 while opening 158 is aligned with a radiation tube 160 powered by a resonant transformer 161. A housing 162 seals the space between the end of the tube 160 and opening 158 in plate 133. A first vacuum passage-way 163 is cut in the bottom of top plate 133 and is positioned so as to come into communication with wells 137 just after the wells have moved sufficiently far under top plate 133 so as to no longer be in communication with opening 159 therein. Vacuum passage-way 163 communicates with a pipe on 164 connected to a suitable source of vacuum. A second passage-way 165 is in the bottom side of top plate 133 and connects with a pipe 166. Passage-way 165 is positioned to be in communication with opening 158 and with the wells 137 when the wells are positioned under tube 160 at which time the well forms a radiation chamber. Pipe 166 connects to a suitable source of vacuum for providing the low pressure in the radiation chamber to balance the low pressure in radiation tube 160. A third passage-way 167 is cut in the underside of top plate 133 extending back from the edge of opening 159 so as to provide the gradual release of the vacuum within the wells 137 as they move towards opening 159.

If desired a set of shelves 170 mounted on adjustable brackets 171 may be provided within wells 137 so as to position various sizes of products within the wells. It is desirable to have the product, such as the packages 172, positioned as closely as possible to the end of tube 160. Motor 155 is operated so as to turn rotatable member 134 in the direction indicated by arrow 175. With motor 155 energized, vacuum supplied through pipes 164 and 166 and transformer 161 energized, a package of product 172 is placed in each well as that well appears under cutout 159 in plate 133. The Geneva drive of the power means turns the rotatable member 134 a step at a time in the direction indicated by arrow 175. As each well 137 moves from beneath the cutout 159 and the top thereof is sealed by top plate 133. The well comes into communication with passage-way 163 which evacuates the well. Thus the well at this position serves as an entrance lock to the radiation chamber. With the next step of movement of the Geneva drive the well moves under tube 160 and the product 172 is radiated by the electrons from tube 160. At this position the well forms a radiation chamber. Preferably a vacuum check switch such as switch 104 illustrated in Figure 4 is connected in pipe 164 to make sure that an adequate amount of vacuum is drawn on the well at the time it is in the entrance lock position and before it moves to the radiation chamber position. If adequate vacuum is not drawn, the switch will de-energize motor 155 to prevent an inordinate rise in pressure in the radiation chamber below tube 160.

With the next step of movement of the Geneva drive, the well 137 moves from below tube 160 to a position opposite the entrance lock position. At this latter position the well forms the outlet lock. With the fourth step of movement of the Geneva drive the well 137 comes into communication with passage-way 167 which gradually reestablishes the ambient pressure within the chamber. The chamber continues to move into the position illustrated in Figure 6 where it is completely below cut out 159. At this latter position the irradiated product may be removed from the well 137 and a new package of product inserted therein.

The embodiment of Figures 7 and 8 illustrate a modification in which the product is moved out and in through the same lock. In other words, only one lock is used both to insert product and remove the product from the radiation chamber. In this embodiment the frame generally 180 forms a rectangular casing which is divided by doors 181 and 182 into a lock 183 a radiation chamber 184. At the bottom side of the frame 180 are a pair of chests 185 and 186 to receive doors 181 and 182 respectively. In this embodiment the chests 185 and 186 are sufficiently large to receive air cylinders 187 and 188 so that no stuffing boxes are needed other than those normally on an air cylinder. Carts 189 having a plurality of wheels 190 are used to carry the product 191 to be irradiated into and out of radiation chamber 184.

A pair of tracks 192 spaced to fit the wheels 190 of carts 189 are used outside the chamber to roll the carts into lock 183. At the end of each of tracks 192 is a bridge 193 pivotally connected to track 192. A spring 194 connecting bridge 193 and track 192 normally urges the bridge into the upward position shown in the drawings. Similarly within lock 183 are a pair of tracks 195 supported from the walls of frame 180 by brackets 196. Bridges 197 pivotally attached to tracks 195 are urged upwardly by springs 198. Within radiation chamber 184 a pair of tracks 199 are secured to a cross member 200, which cross member is attached to the piston rod 201 of an air cylinder 202. Air cylinder 202 is received in a well 203 in the bottom of frame 180. At the opposite side of radiation chamber 184 is an opening 204 which communicates with the tube 205 of the radiation equipment.

To move the carts 189 from lock 183 into radiation chamber 184 an air cylinder 208 is mounted in lock 183. A re-entrant bar 209 is attached to the piston rod of cylinder 208. A hinged pusher member 211 is pivotally connected to bar 209 and a spring 212 holds pusher member 211 against a stop 213 on bar 209. Thus pusher member 211 is permitted to pivot forwardly with respect to bar 209 but not to turn backwardly from the vertical position. To transfer the carts 189 from radiation chamber 184 back into lock 183 an air cylinder 215 is used which is mounted in a well 216 in the wall of frame 180. The piston rod 217 of cylinder 215 carries a pusher 218 on the end thereof. A cut out 219 is provided in the bottom wall of frame 180 to receive the tracks 199 and cross member 200 as they are lowered by air cylinder 202 to a position at which the tracks are level with the bottom floor of the air lock 183. Pipe 225 connects radiation chamber 184 with a suitable source of vacuum and pipe 226 connects lock 183 with a suitable source of vacuum through a control valve corresponding to that illustrated at 104 in Figure 4. The control apparatus for the embodiment may consist of parts corresponding to those described in connection with Figure 4 with their connections being suitably modified to carry out the sequence of operations hereinafter described.

In operation the radiation chamber is evacuated and the power source, not shown, feeding electron tube 205 energized. With the doors all closed and lock 183 at atmoshperic pressure, fluid cylinder 187 is actuated to open door 181. A cart 189 carrying product is pushed by hand from tracks 192 into lock 183 and onto tracks 195. The movement of the cart lowers bridges 193 against the resistance of springs 194. After the cart has passed into the lock 183, the springs 194 will raise bridges 193. As the cart passes pusher 211, this pusher is pivoted forwardly against the resistance of springs 212. As soon as the cart has passed beyond pusher 211, spring 212 returns the pusher 211 to the position illustrated in Figure 7. After door 181 is closed, a vacuum is applied to the lock 183 through pipe 226 and the pressure is reduced to a pressure equaling that in the radiation chamber 184. At this time air cylinder 188 is energized to open door 182. When door 182 is first opened, tracks 199 are lowered to be received in recesses 219. Air cylinder 215 is energized and pusher 218 moves a cart 189 from tracks 199 into the bottom of lock 183. After the retraction of pusher 218, air cylinder 202 raises track 199 to the position illustrated in Figure 7. Subsequently air cylinder 208 is actuated to move pusher 211 to the right in Figure 7 and move the cart from tracks 195 onto the tracks 199. During this movement bridges 197 are lowered against the resistance of springs 198. The springs return the bridges to the upright position after the cart has moved into the radiation chamber. Pusher 211 is then retracted and door 182 is closed. The product 191 in the cart in the radiation chamber 184 is bombarded with electrons from tube 205. Lock 183 is returned to atmospheric pressure and door 181 is opened. If a cart is in the bottom of lock 183, it is drawn out of the lock. A new cart with product thereon is rolled from tracks 192 onto tracks 195 as previously described.

The foregoing detailed description of the specific embodiments is only for clearness of understanding and for the purpose of complying with 35 U.S.C. 112 and we do not desire to be limited to the exact details of construction shown and described for obvious modifications will occur to a person skilled in the art. For example, various other types of radiation equipment could be used (see Nuclear Radiation Physics, by Lapp and Andrews, Printice-Hall, Inc., published 1948, particularly chapter 12). The electron tubes described could be powered by a Van de Graaff generator or by a capacitron (see Patent 2,429,217). A linear accelerator could be used for the production of electrons, etc.

We claim:

1. Apparatus for the irradiation of a substance including a radiation chamber, a radiation source including an evacuated radiation tube having an end within said chamber, vacuation means connected to said chamber to maintain said chamber at a reduced air pressure to substantially balance said evacuation of said tube at said end, air lock means associated with said chamber, and conveyor means associated with said chamber and said lock means to move the substance to be irradiated into and out of said chamber without substantially raising the air pressure in said chamber whereby said balance will be maintained.

2. Apparatus for the irradiation of a substance including a radiation source having an evacuated radiation tube having an end, means to evacuate the space about said end of said tube to substantially the evacuation pressure of said tube, substance carrier means, chamber means defining a confined space about said substance, means associated with said carrier to sequentially vacuate the space about said substance to substantially said pressure, move said substance into said space about said end, move said substance out of said space about said end of said tube and restore normal air pressure to said space about said substance.

3. Apparatus for the irradiation of a substance, said apparatus including a radiation chamber, a source of radiation associated with said chamber, means to maintain a reduced air pressure in said chamber, air lock means adjacent said chamber, door means between said lock means and said chamber and between said lock means and the outside thereof, said vacuation means being connected to said lock means, a substance carrier receivable within said lock means and within said chamber, and power means connected to said door means and said vacuation means to apply normal air pressure to said lock means, to open the door means between said lock means and the outside thereof whereby a carrier with substance may be inserted into said lock means, to close said open door means, to vacuate said lock means, to open the door means between said lock means and said chamber whereby said carrier may be moved into said chamber, and to close said open door means.

4. Apparatus for the irradiation of a substance including a tube, four movable doors in said tube dividing said tube into three chambers, substance conveyor means to move the substance between said chambers when the communicating doors are open, a source of radiation associated with one chamber, vacuating means connected to said three chambers to vacuate said chambers, and power means connected to said doors and to said vacuation means to apply normal air pressure to a second of said chambers, to open the door leading to said second chamber whereby said substance may be inserted into said second chamber, to vacuate said second chamber, to open the door between said first and second chamber whereby said substance may be moved from said second to said first chambers, to open the door between the first and third chambers whereby said substance may be moved from said first to the third chambers, to close said door between said first and third chambers, to apply normal air pressure to said third chamber, and to open the door leading to said third chamber whereby said substance may be removed from said third chamber.

5. Apparatus for the irradiation of substance including a tube, four movable doors in said tube dividing said tube into three chambers, substance conveyor means to move the substance between said chambers when the communicating doors are open, a source of radiation associated with the middle chamber, vacuation means connected to said three chambers to vacuate said chambers, and power means connected to said doors and to said vacuation means repeatedly to apply normal air pressure to one end chamber and to vacuate said other end chamber, to open the outside door of said one end chamber whereby substance may be inserted into said one end chamber, and the door between the middle chamber and the other end chamber whereby substance may be moved from said middle chamber to said other end chamber, to close said open doors, to vacuate said one end chamber and apply normal air pressure to said other end chamber, to open the door between said one end chamber and the middle chamber whereby substance in said one end chamber may be moved into said middle chamber and the outside door of said other end chamber whereby substance in said other end chamber may be removed, and to close said open doors.

6. Apparatus for the irradiation of a substance includ ing a vertical tube, generally horizontal doors in said tube dividing said tube into three chambers, a plurality of substance carriers receivable within each of said chambers, guide means associated with said carriers and said tube to align said carriers in said tube, rotatable supporting means on the bottom of said carriers, a source of radiation associated with the middle chamber, vacuation means connected to said three chambers to vacuate said chambers, and power means connected to said doors and to said vacuation means repeatedly to apply normal air pressure to the upper end chamber and to vacuate the lower end chamber, to open the outside door of said upper end chamber whereby substance may be inserted into said chamber and the door between the middle chamber and the lower end chamber whereby substance may be moved from said middle chamber to said lower end chamber, to close said open doors, to vacuate said upper end chamber and apply normal air pressure to said lower end chamber, to open the door between the upper end chamber and the middle chamber whereby substance in said upper end chamber may be moved into said middle chamber and the outside door of said lower end chamber whereby substance in said lower end chamber may be removed, and to close said open doors.

7. Apparatus for the irradiation of a substance including a tube, four movable doors in said tube dividing said tube into three chambers, substance conveyor means to move the substance between said chambers when the communicating doors are open, means associated with said conveyor means to rotate said substance, a source of radiation associated with the middle chamber, vacuation means connected to said three chambers to vacuate said chambers, and power means connected to said doors and to said vacuation means repeatedly to apply normal air pressure to one end chamber and to vacuate said other end chamber, to open the outside door of said one end chamber whereby substance may be inserted into said one end chamber and the door between the middle chamber and the other end chamber whereby substance may be moved from said middle chamber to said other end chamber, to close said open doors, to vacuate said one end chamber and apply normal air pressure to said other end chamber, to open the door between said one end chamber and the middle chamber whereby substance in said one end chamber may be moved into said middle chamber and the outside door of said other end chamber whereby substance in said other end chamber may be removed, and to close said open doors.

8. Apparatus for the irradiation of a substance including a plurality of movable chambers, power means connected to said chambers to move said chambers along a given path in a given direction, at a first point along said path, said chambers being open for the insertion and removal of product, closure means associated with said chambers, and effective at a second point along said path in said direction from said first point to close said chambers, means to vacuate said closed chambers, and a source of radiation including an evacuated radiation tube having a radiation emitting end at a third point along said path in said direction from said second point, said closure means having an opening operative at said third point through which said evacuated chambers are placed in communication with said end of said tube radiation source without destroying the vacuum in said chambers whereby said vacuum in said chambers will substantially balance the evacuation of said tube at said end and said end of said tube will not be subjected to atmospheric pressure.

9. Apparatus for the irradiation of a substance including a rotatable member, a plurality of chambers attached to said member, power means connected to said member to rotate said chambers along a given path in a given direction, at a first point along said path, said chambers being open for the insertion and removal of product, closure means associated with said chambers, and effective at a second point along said path in said direction from said first point to close said chambers, means to vacuate said closed chambers, and a source of radiation including an evacuated radiation tube having a radiation emitting end at a third point along said path in said direction from said second point, said closure means having an opening operative at said third point through which said vacuated chambers are placed in communication with said end without destroying the vacuum in said chambers whereby said vacuum in said chambers will substantially balance the evacuation of said tube at said end and said end of said tube will not be subjected to atmospheric pressure.

10. Apparatus for the irradiation of a substance including a radiation chamber, a radiation source including an evacuated tube having an end within said chamber, means connected to said chamber to vacuate said chamber to a given pressure to substantially balance said evacuation of said tube at said end, air lock means, carrier means for said substance and having a space about the substance, and vacuation means associated with said carrier to reduce the pressure of said space about said substance to substantially said given pressure, said carrier means being movable through said lock means to transport said substance into said chamber only after said vacuation means reduces the pressure of said space to substantially said given pressure whereby said balance will be maintained.

11. Apparatus for the irradiation of a substance, said apparatus including a radiation chamber, a source of radiation associated with said chamber, means to maintain a reduced air pressure in said chamber, air lock means adjacent said chamber, door means between said lock means and said chamber and between said lock means and the outside thereof, said vacuation means being connected to said lock means, a substance carrier receivable within said lock means and within said chamber, power means connected to said door means and said vacuation means to apply normal air pressure to said lock means, to open the door means between said lock means and the outside thereof whereby a carrier with substance may be inserted into said lock means, to close said open door means, to vacuate said lock means, to open the door means between said lock means and said chamber whereby said carrier may be moved into said chamber, and to close said open door means, and control means connected to said power means to render said power means ineffective to open the door between said chamber and said lock means until the pressure in said lock means is substantially equal to the pressure in said chamber.

12. A process of irradiating a substance from a radiation source having a vacuated tube from which radiation is emitted from one end thereof, said process comprising the steps of maintaining said end of said tube at a pressure substantially corresponding to the pressure of said vacuated tube, vacuating a first space about said substance, subsequently positioning said substance adjacent said tube with said end of said tube in said space, irradiating said substance, subsequently moving said substance away from said end of said tube, and subsequently restoring the normal air pressure to the space about said substance.

13. A process of radiating a substance from a radiation source having a vacuated radiation tube having a radiation emitting end, said process comprising the steps of maintaining said end of said tube at a pressure substantially corresponding to the pressure of said vacuated tube, moving groups of said substance along a given path in a given direction, at a first point along said path vacuating the space about each group as each arrives at said point, at a second point along said path in said direction from said first point aligning each said vacuated group with said tube with said end of said tube in said vacuated space and irradiating each group, moving each said irradiated group away from said tube and restoring normal air pressure to each group after it has been moved away from said tube.

14. A process of radiating a substance from a radiation source having a radiation tube maintained at substantially a given pressure, said process comprising maintaining the pressure in the space beyond the end of said tube at substantially said pressure, vacuating the space about said substance to substantially said pressure, and thereafter placing said substance adjacent said end of said tube in alignment with said tube and in communication with said space beyond the end of said tube without substantially changing the pressure in said space beyond the end of said tube.

References Cited in the file of this patent

UNITED STATES PATENTS

| | | |
|---|---|---|
| 2,429,217 | Brasch | Oct. 21, 1947 |
| 2,767,321 | Woodhull | Oct. 16, 1956 |
| 2,785,066 | Dean | Mar. 12, 1957 |
| 2,798,847 | Fermi et al. | July 9, 1957 |

OTHER REFERENCES

High Voltage Engineering Corp., Bulletin E, pages 22–31.